(12) United States Patent
Zhang et al.

(10) Patent No.: US 11,152,997 B2
(45) Date of Patent: Oct. 19, 2021

(54) BEAM ACQUISITION WITH RECEIVING BEAMFORMING

(71) Applicant: Intel IP Corporation, Santa Clara, CA (US)

(72) Inventors: Yushu Zhang, Beijing (CN); Gang Xiong, Portland, OR (US); Yuan Zhu, Beijing (CN); Ralf Bendlin, Portland, OR (US); Jong-Kae Fwu, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/408,450

(22) Filed: May 9, 2019

(65) Prior Publication Data

US 2019/0334606 A1 Oct. 31, 2019

Related U.S. Application Data

(63) Continuation of application No. 15/747,049, filed as application No. PCT/US2015/067167 on Dec. 21, 2015, now abandoned.

(30) Foreign Application Priority Data

Aug. 27, 2015 (WO) ................ PCT/CN2015/088208

(51) Int. Cl.
*H04B 7/06* (2006.01)
*H04L 27/26* (2006.01)
(Continued)

(52) U.S. Cl.
CPC ......... *H04B 7/0695* (2013.01); *H04B 7/0617* (2013.01); *H04B 7/088* (2013.01);
(Continued)

(58) Field of Classification Search
CPC .... H04B 7/0695; H04B 7/088; H04B 7/0617; H04L 5/0048; H04L 27/2613; H04W 76/27
See application file for complete search history.

(56) References Cited

U.S. PATENT DOCUMENTS

2009/0180567 A1 7/2009 She et al.
2013/0064129 A1 3/2013 Koivisto et al.
(Continued)

FOREIGN PATENT DOCUMENTS

CN 101427595 A 5/2009
CN 103004160 A 3/2013
(Continued)

OTHER PUBLICATIONS

International Preliminary Report on Patentability received for International Application No. PCT/US2015/067167, dated Mar. 8, 2018, 13 pages.
(Continued)

*Primary Examiner* — Jackie Zuniga Abad
(74) *Attorney, Agent, or Firm* — Spectrum IP Law Group LLC

(57) ABSTRACT

Briefly, in accordance with one or more embodiments, an apparatus of a user equipment (UE) comprising circuitry to receive a Beamforming Reference Signal (BRS) transmission from an evolved NodeB (eNB) via one or more transmission beams, divide the one or more transmission beams into one or more transmission beam sets, wherein a transmission beam set comprises a number of consecutive orthogonal frequency-division multiplexing (OFDM) symbols, scan consecutive receiving beams for corresponding transmission beam sets to obtain channel measurements to select a transmission beam and a receiving beam based at least in part on the channel measurements, and receive
(Continued)

transmissions from the eNB using the selected transmission beam and the selected receiving beam.

12 Claims, 7 Drawing Sheets

(51) Int. Cl.
*H04W 76/27* (2018.01)
*H04B 7/08* (2006.01)
*H04L 5/00* (2006.01)

(52) U.S. Cl.
CPC ........ *H04L 5/0048* (2013.01); *H04L 27/2613* (2013.01); *H04W 76/27* (2018.02)

(56) References Cited

U.S. PATENT DOCUMENTS

| | | |
|---|---|---|
| 2014/0064135 A1 | 3/2014 | Chen |
| 2014/0177561 A1 | 6/2014 | Yu et al. |
| 2014/0198681 A1 | 7/2014 | Jung et al. |
| 2015/0003325 A1* | 1/2015 | Sajadieh ........... H04L 25/03891 370/328 |
| 2015/0208443 A1 | 7/2015 | Jung et al. |
| 2016/0028519 A1 | 1/2016 | Wei |
| 2016/0285660 A1 | 9/2016 | Frenne et al. |
| 2016/0323029 A1* | 11/2016 | Cheng ................. H04B 7/0617 |
| 2018/0367204 A1 | 12/2018 | Zhang et al. |
| 2019/0104549 A1 | 4/2019 | Deng |

FOREIGN PATENT DOCUMENTS

| | | |
|---|---|---|
| CN | 103095355 A | 5/2013 |
| CN | 103634034 A | 3/2014 |
| CN | 104521155 A | 4/2015 |
| CN | 104718712 A | 6/2015 |
| TW | 201203922 A | 1/2012 |
| WO | 2015109153 A1 | 7/2015 |
| WO | 2017/034606 A1 | 2/2017 |

OTHER PUBLICATIONS

International Search Report and Written Opinion received for International Application No. PCT/US2015/067167, dated May 31, 2016, 17 pages.
Office Action and Search Report dated Nov. 26, 2019 issued for corresponding Taiwanese Patent Application No. 105123078.
Office Action and Search Report dated Oct. 10, 2020 issued for corresponding Chinese Patent Application No. 201580081983.9.
Second Office Action dated Jun. 3, 2021 issued for corresponding Chinese Patent Application No. 201580081983.9.

* cited by examiner

BEAM ACQUISITION WITH RECEIVING BEAMFORMING

CROSS-REFERENCE TO RELATED APPLICATIONS

The present application is a continuation of Ser. No. 15/747,049 filed Jan. 23, 2018 which is a national stage filing of International Application No. PCT/US2015/067167 filed Dec. 21, 2015 which in turn claims priority under 35 U.S.C. 365(b) to International Application No. PCT/CN2015/088208 filed Aug. 27, 2015. Said application Ser. No. 15/747,049, said Application No. PCT/US2015/067167, and said Application No. PCT/CN2015/088208 are hereby incorporated herein by reference in their entireties.

BACKGROUND

In a wireless network operating in accordance with a Fifth Generation (5G) system, the evolved NodeB (eNB) may have a set of analog transmission (Tx) beams to support massive multiple-input, multiple-output (MIMO). The user equipment (UE) may scan these Tx beams and decide which beam to be the best when accessing the network. The Beamformed Reference Signal (BRS) may be used for a UE to measure the channel state and quality in each beam. The BRS and Primary Synchronized Signal (PSS) may be transmitted in the same subframe, where the BRS may be mapped around the PSS and divided into several groups. Each BRS group may have No sequences and be mapped into Ni Resource Blocks (RBs). Each orthogonal frequency-division multiplexing (OFDM) symbol may take one BRS sequence, and the analog beamforming weight may be different for each BRS sequence. In one example, No may be 12 and Ni may be 6.

The Tx beamforming weight for each BRS sequence may be different. The eNB may maintain, for example, a total of $K_0*N_0$ beams and K BRS resources. In one example, $K_0$ may be 4. Then the $K_0*N_0$ beams may be transmitted within a subframe. For omni-antenna UEs, the $K_0*N_0$ beams could be scanned within a subframe. For directional-antenna based UEs, however, receiving (RX) beamforming may be used to further increase the link budget and coverage. For each RX beam, the $K_0*N_0$ TX beams may be scanned within a subframe. Depending on UE specific beamforming architecture, there could be a total of P RX beams on the UE side, for example P=18.

In the conventional Rx beamforming scanning procedure, the UE uses one Rx beamforming weight within one PSS/BRS subframe for Rx beamforming. In this case, the Tx and Rx beam scanning procedure may be finished in P BRS subframes. Assuming the BRS transmission period is Q subframes, overall latency for Rx beamforming acquisition could be P*Q subframes. In one example, P=18 and Q=25, which indicates that a total of 450 subframes are could be used for Rx beamforming acquisition, which may not be desirable in term of overall latency and power consumption.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
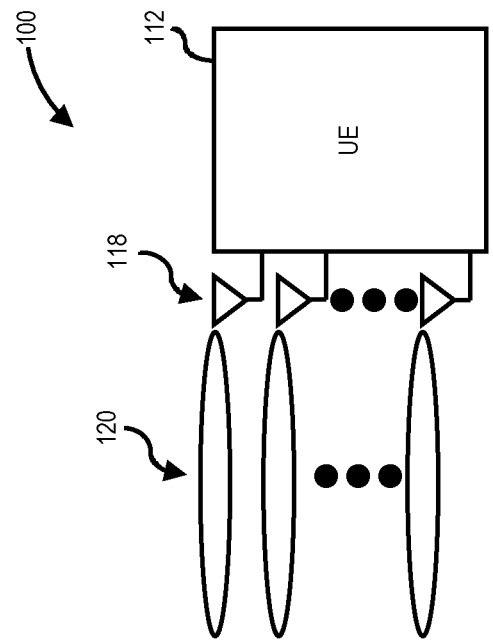
FIG. 1 is diagram of a network illustrating a set of transmission beams and a set of receiving beams in accordance with one or more embodiments.
Figure 1:
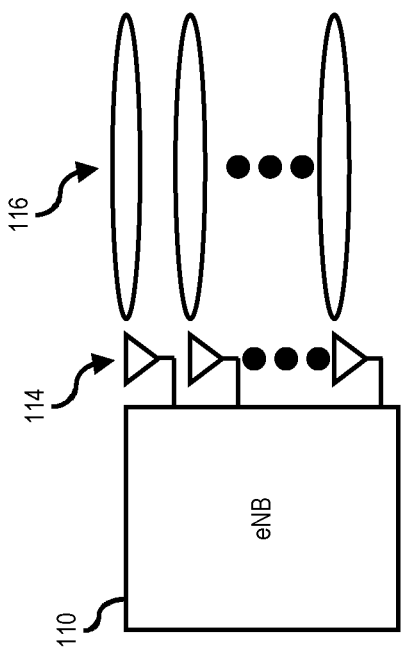

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a network illustrating a set of transmission beams and a set of receiving beams in accordance with one or more embodiments will be discussed. As shown in FIG. 1, network 100 may include an evolved Node B (eNB) 110 serving a user equipment (UE) 112. The eNB 110 may have two or more antennas 114 to generate one or more transmission (Tx) beams 116, and the UE 112 may have two or more antennas 118 to form one or more receiving (Rx) beams 120. In one or more embodiments, network 100 may be in compliance with a Third Generation Partnership Project (3GPP) standard, and in particular may be in compliance with a Fifth Generation (5G) wireless standard, although the scope of the claimed subject matter is not limited in this respect. As discussed herein, the UE 112 utilizes Rx beam acquisition in accordance with a 5G system, for example to implement reduced delay for beam acquisition with Rx beamforming in cooperation with the eNB 110, although the scope of the claimed subject matter is not limited in this respect. In one example, the eNB 110 may use 18 Tx beams 116, and the UE 112 may use 18 Rx beams. Different beams may be transmitted in different OFDM symbols. The UE 112 measures the Beam Reference Signals (BRS) transmitted by the eNB 110, and divides the number of Rx beams into several Rx beam groups, for example based at least in part on beam correlation. The UE 112 will determined the number of beams for each group. In some embodiments, consecutive OFDM symbols may use one of the Rx beam groups. An example of a receiving beam pattern implemented by the UE 112 is shown in and described with respect to FIG. 2, below.

Figure 2:
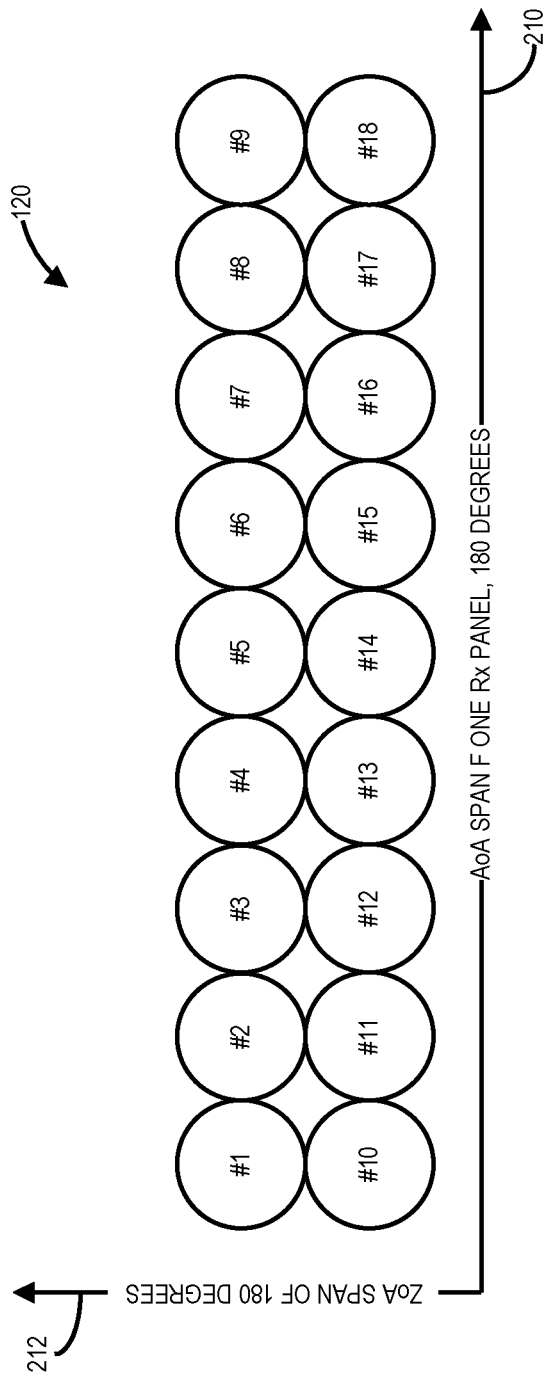
FIG. 2 is a diagram of a receiving beam pattern in accordance with one or more embodiments.

Referring now to FIG. 2, a diagram of a receiving beam pattern in accordance with one or more embodiments will be discussed. The eNB 110 may maintain a set of transmission (Tx) beams 116 in a 5G system, and when accessing the network 100, the UE 112 measures and selects which one or more of beams 116 to be a beast or nearly best match. All of the Tx beams 116 may be divided into K groups for example, and each group scans full Azimuth angle of Departure (AoD) and Zenith angle of Departure (ZoD) span with coarse spatial granularity. The UE 112 may also maintain a set of receiving (Rx) beams 120, which may be used to cover some Azimuth angle of Arrival (AoA) as shown along axis 210, and Zenith angle of Arrival (ZoA) span as shown along axis 212. For example, the AoA may cover a span of 180 degrees, and the ZoA may cover a span of 180 degrees. As shown in FIG. 2, the UE 112 may have beam pattern 120 with P number of Rx beams, for example where P=18. It should be noted that although 18 Rx beams are shown at the UE 112 side for purposes of example, other values for the number of Rx beams also may be extended from this example, wherein more or fewer Rx beams may be utilized, and the scope of the claimed subject matter is not limited in this respect. An example of a fast beam acquisition procedure is shown in and described with respect to FIG. 3, below.

Figure 3:
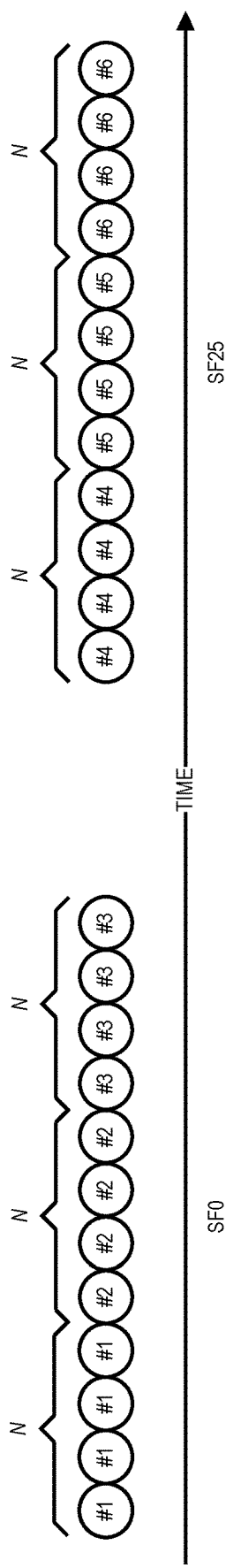
FIG. 3 is a diagram of a fast beam acquisition procedure in accordance with one or more embodiments.

Referring now FIG. 3, a diagram of a fast beam acquisition procedure in accordance with one or more embodiments will be discussed. In order to reduce the latency for beam acquisition, the beams for each Beamformed Reference Signal (BRS) may be divided into K number of sets. In each set, at total of U number of beams may be used, and the full AoD and ZoD span could be covered, where U may meet a criterion as shown below.

$$U \bmod N_{res} = 0$$

In the above expression, $N_{res}$ indicates the number of BRS resources in an orthogonal frequency-division multiplexing (OFDM) symbol. The consecutive N number of OFDM symbols could be indicated as a Tx beam set, where:

$$N = U/N_{res}$$

Then, the UE 112 may use consecutive Rx beams 120 for different Tx beams sets 116 to search the best Tx beam and the best RX beam as shown in the procedure of FIG. 2. In the example shown in FIG. 2, N is set to a value of 4. Subframe 0 (SF0) may use beams beam 1 (#1), beam 2 (#2), and beam 3 (#3). Subframe 25 (SF25) may use beams beam 4 (#4), beam 5 (#5), and beam 6 (#6). For the first N number OFDM symbols, the Rx beam 1 (#1) may be used, and for the second N number OFDM symbols, the Rx beam 2 (#2) may be used. As a result, in this example the total beam searching delay may be reduced approximately 66.7% when N=4, although the scope of the claimed subject matter is not limited in this respect.

In one embodiment, the variable N may be a fixed value in the whole system or configured via higher layer signaling. In another embodiment, the value of N may be implicitly transmitted in the Primary Synchronized Signal (PSS) or in the Beamformed Reference Signal (BRS) as a possible root index. For example, in the system the possible value of N may be:

$$N \in \{4,6\}$$

The root index for the PSS may be increased from a value of 3 to a value of 6. An example PSS root index is shown in Table 1, below.

TABLE 1

Example for PSS root index

| $N_{ID}^{(2)}$ | N | Root index |
|---|---|---|
| 0 | 4 | 25 |
| 1 | 4 | 29 |
| 2 | 4 | 34 |
| 0 | 6 | 39 |
| 1 | 6 | 45 |
| 2 | 6 | 54 |

Figure 4:
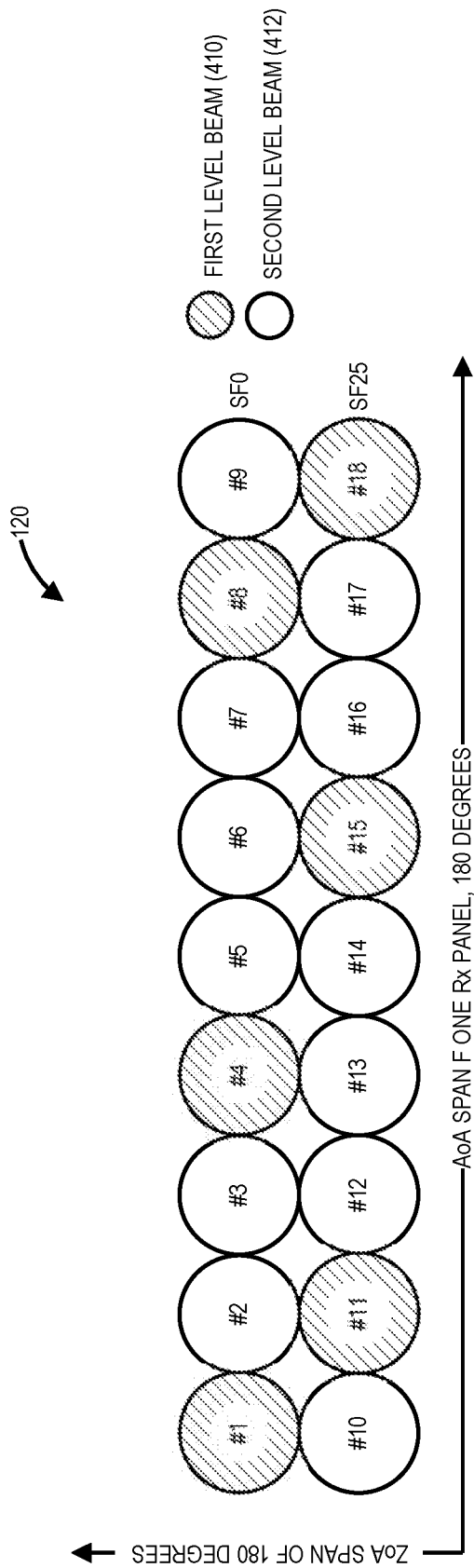
FIG. 4 is a diagram of a fast beam acquisition method in accordance with one or more embodiments.

Referring now to FIG. 4, a diagram of a fast beam acquisition method in accordance with one or more embodiments will be discussed. In the embodiment shown in FIG. 4, the receiving (Rx) beams 120 may be divided into several levels for distributed beam scanning. The beam acquisition process may be in a distributed in such a manner that the first level 410 of the Rx beams are used for scanning, and then the second level 412 of Rx beams, which are the neighbor beams around the best first level beams, are used for the next scanning.

For the example shown in FIG. 4, in subframe 0 (SF0), Rx beams beam 1 (#1), beam 4 (#4) and beam 8 (#8) may be used. In in subframe 25 (SF25), Rx beams beam 11 (#11), beam 15 (#15), and beam 18 (#18) may be used. If Rx beam 4 (#4) is measured as the best beam in the first frame, for the second frame, in subframe 50 (SF50), the RX beams beam 3 (#3), beam 5 (#5), and beam 13 (#13) may be used. Then the best Tx beam and the best Rx beam could be obtained within 50 subframes, which could reduce approximately 88.9% of the delay time, although the scope of the claimed subject matter is not limited in this respect.

Figure 5:
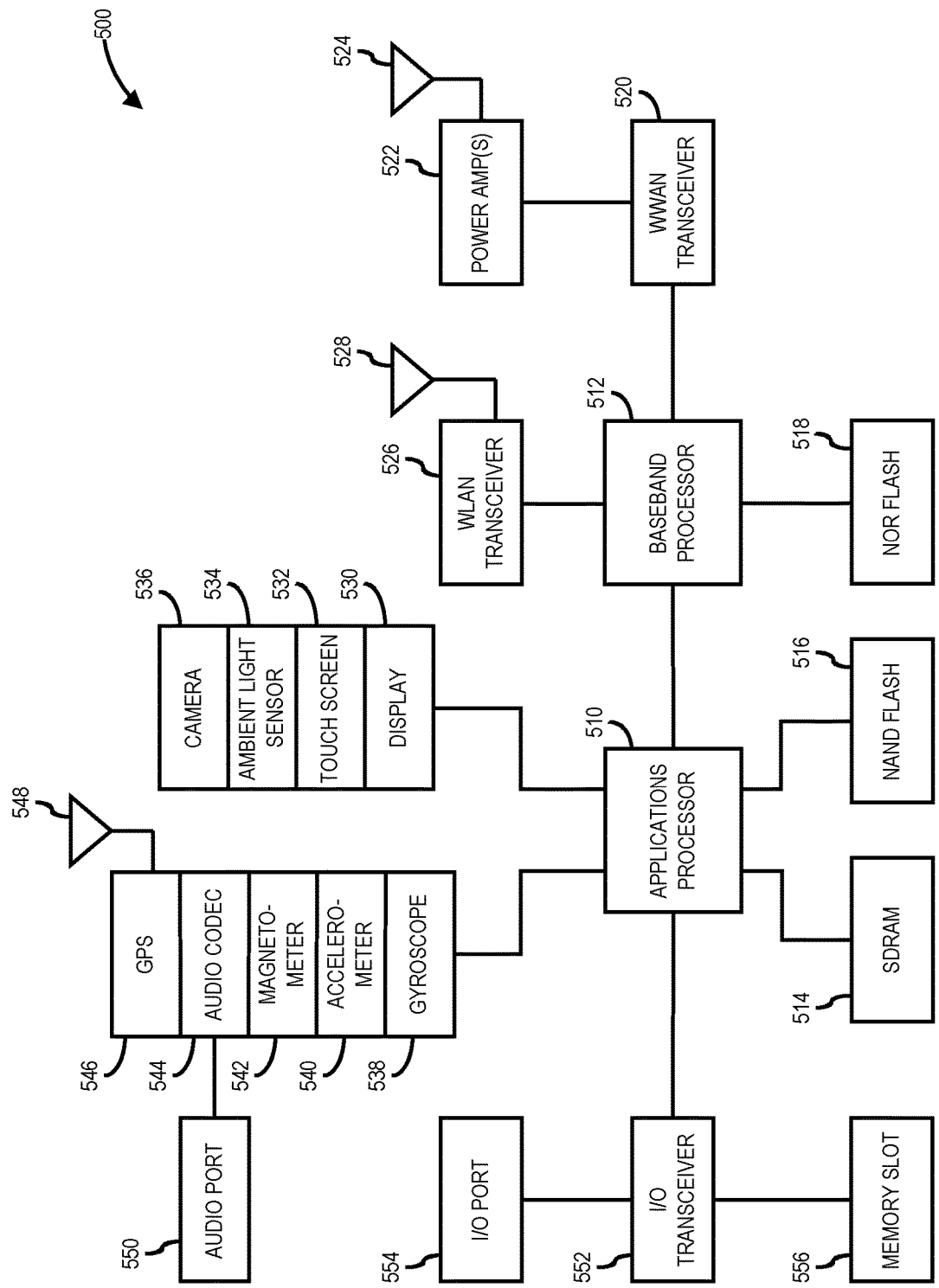
FIG. 5 is a block diagram of an information handling system capable of implementing beam acquisition with receiving beamforming in accordance with one or more embodiments.

Referring now to FIG. 5, a block diagram of an information handling system capable of beam acquisition with receiving beamforming in accordance with one or more embodiments will be discussed. Information handling system 500 of FIG. 5 may tangibly embody any one or more of the network elements described herein, above, including for example the elements of network 100 with greater or fewer components depending on the hardware specifications of the particular device.

In one embodiment, information handling system 500 may tangibly embody an apparatus of a user equipment (UE) comprising baseband processing circuitry to receive a Beamforming Reference Signal (BRS) transmission from an evolved NodeB (eNB) via one or more transmission beams divide the one or more transmission beams into one or more transmission beam sets, wherein a transmission beam set comprises a number of consecutive orthogonal frequency-division multiplexing (OFDM) symbols, scan consecutive receiving beams for corresponding transmission beam sets to obtain channel measurements to select a transmission beam and a receiving beam based at least in part on the channel measurements, and receive transmissions from the eNB using the selected transmission beam and the selected receiving beam. In another embodiment, information handling system 500 may tangibly embody an apparatus of a user equipment (UE) comprising circuitry to receive a Beamforming Reference Signal (BRS) transmission from an evolved NodeB (eNB) via one or more transmission beams, divide receiving beams into two or more levels, scan a first level of receiving beams in a first frame for the one or more transmission beams to obtain channel measurements to select a best transmission beam and a best receiving beam from the first level based at least in part on the channel measurements, scan a second level of receiving beams in a second frame for the one or more transmission beams to obtain channel measurements to select a best transmission beam and a best receiving beam from the second level based at least in part on the channel measurements, select a best transmission beam and a best receiving beam from the scan of the first level and the scan of the second level; and receive transmissions from the eNB using the best transmission beam and the best receiving beam.

In a further embodiment, information handling system 500 may tangibly embody one or more computer-readable media having instructions stored thereon that, if executed by user equipment (UE), result in receiving a Beamforming Reference Signal (BRS) transmission from an evolved NodeB (eNB) via one or more transmission beams, dividing the one or more transmission beams into one or more transmission beam sets, wherein a transmission beam set comprises a number of consecutive orthogonal frequency-division multiplexing (OFDM) symbols, scanning consecutive receiving beams for corresponding transmission beam sets to obtain channel measurements to select a transmission beam and a receiving beam based at least in part on the channel measurements, and receiving transmissions from the eNB using the selected transmission beam and the selected receiving beam. In yet a further embodiment, information handling system 500 may tangibly embody one or more computer-readable media having instructions stored thereon that, if executed by user equipment (UE), result in receiving a Beamforming Reference Signal (BRS) transmission from an evolved NodeB (eNB) via one or more transmission beams, dividing receiving beams into two or more levels, scanning a first level of receiving beams in a first frame for the one or more transmission beams to obtain channel measurements to select a best transmission beam and a best receiving beam from the first level based at least in part on the channel measurements, scanning a second level of receiving beams in a second frame for the one or more transmission beams to obtain channel measurements to select a best transmission beam and a best receiving beam from the second level based at least in part on the channel measurements, selecting a best transmission beam and a best receiving beam from the scan of the first level and the scan of the second level, and receiving transmissions from the eNB using the best transmission beam and the best receiving beam. Although information handling system 500 represents one example of several types of computing platforms, information handling system 500 may include more or fewer elements and/or different arrangements of elements than shown in FIG. 5, and the scope of the claimed subject matter is not limited in these respects.

In one or more embodiments, information handling system 500 may include an application processor 510 and a baseband processor 512. Application processor 510 may be utilized as a general-purpose processor to run applications and the various subsystems for information handling system 500. Application processor 510 may include a single core or alternatively may include multiple processing cores. One or more of the cores may comprise a digital signal processor or digital signal processing (DSP) core. Furthermore, application processor 510 may include a graphics processor or coprocessor disposed on the same chip, or alternatively a graphics processor coupled to application processor 510 may comprise a separate, discrete graphics chip. Application processor 510 may include on board memory such as cache memory, and further may be coupled to external memory devices such as synchronous dynamic random access memory (SDRAM) 514 for storing and/or executing applications during operation, and NAND flash 816 for storing applications and/or data even when information handling system 500 is powered off. In one or more embodiments, instructions to operate or configure the information handling system 500 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 512 may control the broadband radio functions for information handling system 500. Baseband processor 512 may store code for controlling such broadband radio functions in a NOR flash 518. Baseband processor 512 controls a wireless wide area network (WWAN) transceiver 520 which is used for modulating and/or demodulating broadband network signals, for example for communicating via a 3GPP LTE or LTE-Advanced network or the like.

In general, WWAN transceiver 520 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, millimeter wave (mm-Wave) standards in general for wireless systems operating at 10-90 GHz and above such as WiGig, IEEE 802.11ad, IEEE 802.11ay, and so on, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 520 couples to one or more power amps 542 respectively coupled to one or more antennas 524 for sending and receiving radio-frequency signals via the WWAN broadband network. The baseband processor 512 also may control a wireless local area network (WLAN) transceiver 526 coupled to one or more suitable antennas 528 and which may be capable of communicating via a Wi-Fi, Bluetooth®, and/or an amplitude modulation (AM) or frequency modulation (FM) radio standard including an IEEE 802.11a/b/g/n standard or the like. It should be noted that these are merely example implementations for application processor 510 and baseband processor 512, and the scope of the claimed subject matter is not limited in these respects. For example, any one or more of SDRAM 514, NAND flash 516 and/or NOR flash 518 may comprise other types of memory technology such as magnetic memory, chalcogenide memory, phase change memory, or ovonic memory, and the scope of the claimed subject matter is not limited in this respect.

In one or more embodiments, application processor 510 may drive a display 530 for displaying various information or data, and may further receive touch input from a user via a touch screen 532 for example via a finger or a stylus. An ambient light sensor 534 may be utilized to detect an amount of ambient light in which information handling system 500 is operating, for example to control a brightness or contrast value for display 530 as a function of the intensity of ambient light detected by ambient light sensor 534. One or more cameras 536 may be utilized to capture images that are processed by application processor 510 and/or at least temporarily stored in NAND flash 516. Furthermore, application processor may couple to a gyroscope 538, accelerometer 540, magnetometer 542, audio coder/decoder (CODEC) 544, and/or global positioning system (GPS) controller 546 coupled to an appropriate GPS antenna 548, for detection of various environmental properties including location, movement, and/or orientation of information handling system 500. Alternatively, controller 846 may comprise a Global Navigation Satellite System (GNSS) controller. Audio CODEC 544 may be coupled to one or more audio ports 550 to provide microphone input and speaker outputs either via internal devices and/or via external devices coupled to information handling system via the audio ports 550, for example via a headphone and microphone jack. In addition, application processor 510 may couple to one or more input/output (I/O) transceivers 552 to couple to one or more I/O ports 554 such as a universal serial bus (USB) port, a high-definition multimedia interface (HDMI) port, a serial port, and so on. Furthermore, one or more of the I/O transceivers 552 may couple to one or more memory slots 556 for optional removable memory such as secure digital (SD) card or a subscriber identity module (SIM) card, although the scope of the claimed subject matter is not limited in these respects.

Figure 6:
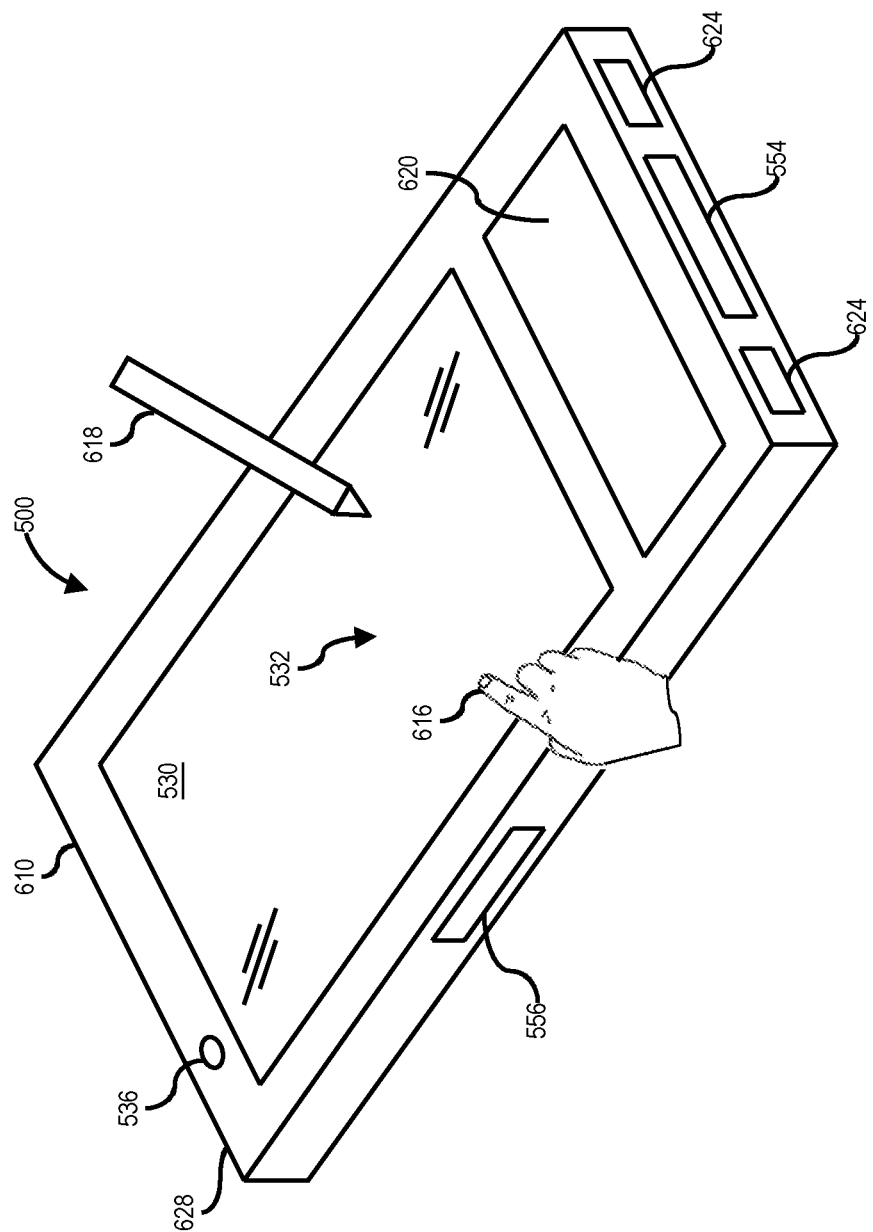
FIG. 6 is an isometric view of an information handling system of FIG. 6 that optionally may include a touch screen in accordance with one or more embodiments.

Referring now to FIG. 6, an isometric view of an information handling system of FIG. 5 that optionally may include a touch screen in accordance with one or more embodiments will be discussed. FIG. 6 shows an example implementation of information handling system 500 of FIG. 5 tangibly embodied as a cellular telephone, smartphone, or tablet type device or the like. The information handling system 500 may comprise a housing 610 having a display 530 which may include a touch screen 532 for receiving tactile input control and commands via a finger 616 of a user and/or a via stylus 618 to control one or more application processors 510. The housing 610 may house one or more components of information handling system 500, for example one or more application processors 510, one or more of SDRAM 514, NAND flash 516, NOR flash 518, baseband processor 512, and/or WWAN transceiver 520. The information handling system 500 further may optionally include a physical actuator area 620 which may comprise a keyboard or buttons for controlling information handling system via one or more buttons or switches. The information handling system 500 may also include a memory port or slot 556 for receiving non-volatile memory such as flash memory, for example in the form of a secure digital (SD) card or a subscriber identity module (SIM) card. Optionally, the information handling system 500 may further include one or more speakers and/or microphones 624 and a connection port 554 for connecting the information handling system 500 to another electronic device, dock, display, battery charger, and so on. In addition, information handling system 500 may include a headphone or speaker jack 628 and one or more cameras 536 on one or more sides of the housing 610. It should be noted that the information handling system 500 of FIG. 6 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 7:
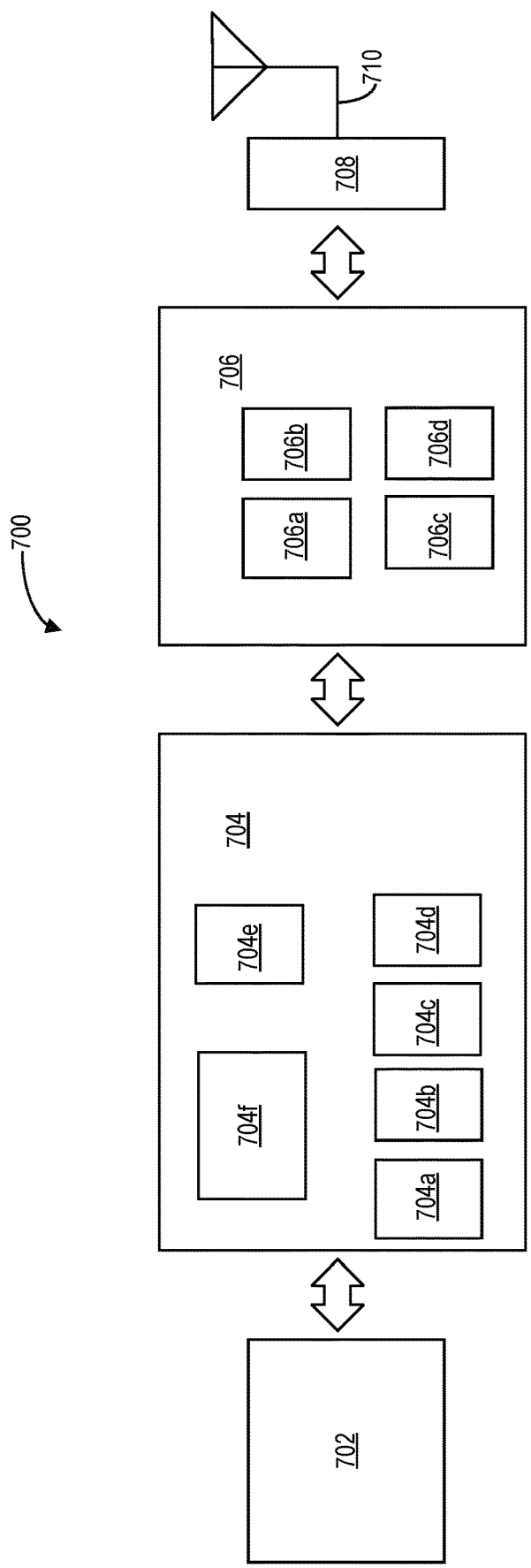
FIG. 7 is a diagram of example components of a wireless device in accordance with one or more embodiments.

Referring now to FIG. 7, example components of a wireless device such as the evolved Node B (eNB) 110 or the user equipment (UE) device 112 in accordance with one or more embodiments will be discussed. In some embodiments, wireless device 700 of may include application circuitry 702, baseband circuitry 704, Radio Frequency (RF) circuitry 706, front-end module (FEM) circuitry 708 and one or more antennas 710, coupled together at least as shown.

Application circuitry 702 may include one or more application processors. For example, application circuitry 702 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 704 may include circuitry such as, but not limited to, one or more single-core or multi-core processors. Baseband circuitry 704 may include one or more baseband processors and/or control logic to process baseband signals received from a receive signal path of RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or one or more other baseband processors 704d for other existing generations, generations in development or to be developed in the future, for example fifth generation (5G), sixth generation (6G), and so on. Baseband circuitry 704, for example one or more of baseband processors 704a through 704d, may handle various radio control functions that enable communication with one or more radio networks via RF circuitry 706. The radio control functions may include, but are not limited to, signal modulation and/or demodulation, encoding and/or decoding, radio frequency shifting, and so on. In some embodiments, modulation and/or demodulation circuitry of baseband circuitry 704 may include Fast-Fourier Transform (FFT), precoding, and/or constellation mapping and/or demapping functionality. In some embodiments, encoding and/or decoding circuitry of baseband circuitry 804 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. Processor 704e of the baseband circuitry 704 may be configured to run elements of the protocol stack for signaling of the PHY, MAC, RLC, PDCP and/or RRC layers. In some embodiments, the baseband circuitry may include one or more audio digital signal processors (DSP) 704f. The one or more audio DSPs 704f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 704 and application circuitry 702 may be implemented together such as, for example, on a system on a chip (SOC).

In some embodiments, baseband circuitry 704 may provide for communication compatible with one or more radio technologies. For example, in some embodiments, baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 804 is configured to support radio communications of more than one wireless protocol may be referred to as multi-mode baseband circuitry.

RF circuitry 706 may enable communication with wireless networks using modulated electromagnetic radiation through a non-solid medium. In various embodiments, RF circuitry 706 may include switches, filters, amplifiers, and so on, to facilitate the communication with the wireless network. RF circuitry 706 may include a receive signal path which may include circuitry to down-convert RF signals received from FEM circuitry 708 and provide baseband signals to baseband circuitry 704. RF circuitry 706 may also include a transmit signal path which may include circuitry to up-convert baseband signals provided by the baseband circuitry 704 and provide RF output signals to FEM circuitry 708 for transmission.

In some embodiments, RF circuitry 706 may include a receive signal path and a transmit signal path. The receive signal path of RF circuitry 706 may include mixer circuitry 706a, amplifier circuitry 706b and filter circuitry 706c. The transmit signal path of RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from FEM circuitry 708 based on the synthesized frequency provided by synthesizer circuitry 706d. Amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, mixer circuitry 706a of the transmit signal path may be configured to up-convert input baseband signals based on the synthesized frequency provided by synthesizer circuitry 706d to generate RF output signals for FEM circuitry 708. The baseband signals may be provided by the baseband circuitry 1004 and may be filtered by filter circuitry 706c. Filter circuitry 706c may include a low-pass filter (LPF), although the scope of the embodiments is not limited in this respect.

In some embodiments, mixer circuitry 706a of the receive signal path and the mixer circuitry 706a of the transmit signal path may include two or more mixers and may be arranged for quadrature down conversion and/or up conversion respectively. In some embodiments, mixer circuitry 706a of the receive signal path and the mixer circuitry 706a of the transmit signal path may include two or more mixers and may be arranged for image rejection, for example Hartley image rejection. In some embodiments, mixer circuitry 706a of the receive signal path and the mixer circuitry 706a may be arranged for direct down conversion and/or direct up conversion, respectively. In some embodiments, mixer circuitry 706a of the receive signal path and mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 706 may include analog-to-digital converter (ADC) and digital-to-analog converter (DAC) circuitry, and baseband circuitry 704 may include a digital baseband interface to communicate with RF circuitry 706. In some dual-mode embodiments, separate radio integrated circuit (IC) circuitry may be provided for processing signals for one or more spectra, although the scope of the embodiments is not limited in this respect.

In some embodiments, synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

Synthesizer circuitry 706d may be configured to synthesize an output frequency for use by mixer circuitry 706a of RF circuitry 706 based on a frequency input and a divider control input. In some embodiments, synthesizer circuitry 706d may be a fractional N/N+1 synthesizer.

In some embodiments, frequency input may be provided by a voltage controlled oscillator (VCO), although that is not a requirement. Divider control input may be provided by either baseband circuitry 704 or applications processor 702 depending on the desired output frequency. In some embodiments, a divider control input (e.g., N) may be determined from a look-up table based on a channel indicated by applications processor 702.

Synthesizer circuitry 706d of RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 1006 may include an in-phase and quadrature (IQ) and/or polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by RF circuitry 706 for transmission by one or more of the one or more antennas 710.

In some embodiments, FEM circuitry 708 may include a transmit/receive (TX/RX) switch to switch between transmit mode and receive mode operation. FEM circuitry 708 may include a receive signal path and a transmit signal path. The receive signal path of FEM circuitry 708 may include a low-noise amplifier (LNA) to amplify received RF signals and to provide the amplified received RF signals as an output, for example to RF circuitry 706. The transmit signal path of FEM circuitry 708 may include a power amplifier (PA) to amplify input RF signals, for example provided by RF circuitry 706, and one or more filters to generate RF signals for subsequent transmission, for example by one or more of antennas 710. In some embodiments, Wireless device 700 may include additional elements such as, for example, memory and/or storage, display, camera, sensor, and/or input/output (I/O) interface, although the scope of the claimed subject matter is not limited in this respect.

The following are example implementations of the subject matter described herein. It should be noted that any of the examples and the variations thereof described herein may be used in any permutation or combination of any other one or more examples or variations, although the scope of the claimed subject matter is not limited in these respects. In example one, an apparatus of a user equipment (UE) comprises baseband processing circuitry to receive a Beamforming Reference Signal (BRS) transmission from an evolved NodeB (eNB) via one or more transmission beams, divide the one or more transmission beams into one or more transmission beam sets, wherein a transmission beam set comprises a number of consecutive orthogonal frequency-division multiplexing (OFDM) symbols, scan consecutive receiving beams for corresponding transmission beam sets to obtain channel measurements to select a transmission beam and a receiving beam based at least in part on the channel measurements, and receive transmissions from the eNB using the selected transmission beam and the selected receiving beam. In example two, the apparatus may include the subject matter of example one or any of the examples described herein, wherein the transmission beam sets cover a full Azimuth angle of Departure (AoD) span or a full Zenith angle of Departure (ZoD) span, or a combination thereof. In example three, the apparatus may include the subject matter of example one or any of the examples described herein, wherein each set of transmission beams may be carried within serval consecutive OFDM symbols by the BRS transmission. In example four, the apparatus may include the subject matter of example one or any of the examples described herein, wherein a number of consecutive OFDM symbols is configured via radio resource control (RRC) signaling. In example five, the apparatus may include the subject matter of example one or any of the examples described herein, wherein a number of consecutive OFDM symbols is configured via a Primary Synchronized Signal (PSS) or a PSS-like signal. In example six, the apparatus may include the subject matter of example one or any of the examples described herein, wherein a root index of the PSS or the PSS-like signal is determined by the number of consecutive OFDM symbols. In example seven, the apparatus may include the subject matter of example one or any of the examples described herein, wherein the consecutive receiving beams are scanning in an ascending beam index order.

In example eight, an apparatus of a user equipment (UE) comprises circuitry to receive a Beamforming Reference Signal (BRS) transmission from an evolved NodeB (eNB) via one or more transmission beams, divide receiving beams into two or more levels, scan a first level of receiving beams in a first frame for the one or more transmission beams to obtain channel measurements to select a best transmission beam and a best receiving beam from the first level based at least in part on the channel measurements, scan a second level of receiving beams in a second frame for the one or more transmission beams to obtain channel measurements to select a best transmission beam and a best receiving beam from the second level based at least in part on the channel measurements, select a best transmission beam and a best receiving beam from the scan of the first level and the scan of the second level, and receive transmissions from the eNB using the best transmission beam and the best receiving beam. In example nine, the apparatus may include the subject matter of example eight or any of the examples described herein, wherein the first level receiving beams covers a full Azimuth angle of Arrival (AoA) span and a full Zenith angle of Arrival (ZoA) span. In example ten, the apparatus may include the subject matter of example eight or any of the examples described herein, wherein second level of receiving beams comprise neighbor beams around the best receiving beam from the first level of receiving beams. In example eleven, the apparatus may include the subject matter of example eight or any of the examples described herein, wherein the neighbor beams may indicate comprise receiving beams having a minimum difference in AoA or ZoA.

In example twelve, one or more computer-readable media may have instructions stored thereon that, if executed by user equipment (UE), result in receiving a Beamforming Reference Signal (BRS) transmission from an evolved NodeB (eNB) via one or more transmission beams, dividing the one or more transmission beams into one or more transmission beam sets, wherein a transmission beam set comprises a number of consecutive orthogonal frequency-division multiplexing (OFDM) symbols, scanning consecutive receiving beams for corresponding transmission beam sets to obtain channel measurements to select a transmission beam and a receiving beam based at least in part on the channel measurements, and receiving transmissions from the eNB using the selected transmission beam and the selected receiving beam. In example thirteen, the one or more computer-readable media may include the subject matter of example twelve or any of the examples described herein, wherein the transmission beam sets cover a full Azimuth angle of Departure (AoD) span or a full Zenith angle of Departure (ZoD) span, or a combination thereof. In example fourteen, the one or more computer-readable media may include the subject matter of example twelve or any of the examples described herein, wherein each set of transmission beams may be carried within serval consecutive OFDM symbols by the BRS transmission. In example fifteen, the one or more computer-readable media may include the subject matter of example twelve or any of the examples described herein, wherein a number of consecutive OFDM symbols is configured via radio resource control (RRC) signaling. In example sixteen, the one or more computer-readable media may include the subject matter of example twelve or any of the examples described herein, wherein a number of consecutive OFDM symbols is configured via a Primary Synchronized Signal (PSS) or a PSS-like signal. In example seventeen, the one or more computer-readable media may include the subject matter of example twelve or any of the examples described herein, wherein a root index of the PSS or the PSS-like signal is determined by the number of consecutive OFDM symbols. In example eighteen, the one or more computer-readable media may include the subject matter of example twelve or any of the examples described herein, wherein the consecutive receiving beams are scanning in an ascending beam index order.

In example nineteen, one or more computer-readable media may have instructions stored thereon that, if executed by user equipment (UE), result in receiving a Beamforming Reference Signal (BRS) transmission from an evolved NodeB (eNB) via one or more transmission beams, dividing receiving beams into two or more levels, scanning a first level of receiving beams in a first frame for the one or more transmission beams to obtain channel measurements to select a best transmission beam and a best receiving beam from the first level based at least in part on the channel measurements, scanning a second level of receiving beams in a second frame for the one or more transmission beams to obtain channel measurements to select a best transmission beam and a best receiving beam from the second level based at least in part on the channel measurements, selecting a best transmission beam and a best receiving beam from the scan of the first level and the scan of the second level, and receiving transmissions from the eNB using the best transmission beam and the best receiving beam. In example twenty, the one or more computer-readable media may include the subject matter of example nineteen or any of the examples described herein, wherein the first level receiving beams covers a full Azimuth angle of Arrival (AoA) span and a full Zenith angle of Arrival (ZoA) span. In example twenty-one, the one or more computer-readable media may include the subject matter of example nineteen or any of the examples described herein, wherein second level of receiving beams comprise neighbor beams around the best receiving beam from the first level of receiving beams. In example twenty-two, the one or more computer-readable media may include the subject matter of example nineteen or any of the examples described herein, wherein the neighbor beams may indicate comprise receiving beams having a minimum difference in AoA or ZoA.

In example twenty-three, a machine-readable storage includes machine-readable instructions, when executed, to realize an apparatus as claimed in any example described herein. In example twenty-four, an apparatus of a user equipment (UE) comprises means for receiving a Beamforming Reference Signal (BRS) transmission from an evolved NodeB (eNB) via one or more transmission beams, means for dividing the one or more transmission beams into one or more transmission beam sets, wherein a transmission beam set comprises a number of consecutive orthogonal frequency-division multiplexing (OFDM) symbols, means for scanning consecutive receiving beams for corresponding transmission beam sets to obtain channel measurements to select a transmission beam and a receiving beam based at least in part on the channel measurements, and means for receiving transmissions from the eNB using the selected transmission beam and the selected receiving beam. In example twenty-five, an apparatus of a user equipment (UE) comprises means for receiving a Beamforming Reference Signal (BRS) transmission from an evolved NodeB (eNB) via one or more transmission beams, means for dividing receiving beams into two or more levels, means for scan a first level of receiving beams in a first frame for the one or more transmission beams to obtain channel measurements to select a best transmission beam and a best receiving beam from the first level based at least in part on the channel measurements, means for scanning a second level of receiving beams in a second frame for the one or more transmission beams to obtain channel measurements to select a best transmission beam and a best receiving beam from the second level based at least in part on the channel measurements, means for selecting a best transmission beam and a best receiving beam from the scan of the first level and the scan of the second level, and means for receiving transmissions from the eNB using the best transmission beam and the best receiving beam.

Although the claimed subject matter has been described with a certain degree of particularity, it should be recognized that elements thereof may be altered by persons skilled in the art without departing from the spirit and/or scope of claimed subject matter. It is believed that the subject matter pertaining to beam acquisition with receiving beamforming and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE) comprising:
one or more baseband processors to:
receive a Beamforming Reference Signal (BRS) transmission from an evolved NodeB (eNB) via one or more transmission beams;
divide receiving beams into two or more levels;
in a first frame:
scan the one or more transmission beams using a first level of receiving beams for the first level;
scan the one or more transmission beams using a second level of receiving beams for the second level;
wherein consecutive receiving beams in the first level of receiving beams and the second level of receiving beams are used for different transmission beams;
select a best receiving beam from the scan of the first level and the scan of the second level;
in a second frame:
scan the one or more transmission beams in the first level of receiving beams and the second level of receiving beams using only neighbor beams immediately neighboring the best receiving beam;
select a best transmission beam based on scans from the first frame and the second frame; and
receive transmissions from the eNB using the best transmission beam and the best receiving beam.

2. The apparatus as claimed in claim 1, wherein the first level receiving beams covers a full Azimuth angle of Arrival (AoA) span and a full Zenith angle of Arrival (ZoA) span.

3. The apparatus as claimed in claim 1, wherein the neighbor beams comprise receiving beams having a minimum difference in Azimuth angle of Arrival (AoA).

4. The apparatus as claims in claim 1, wherein the neighbor beams comprise receiving beams having a minimum difference in Zenith angle of Arrival (ZoA).

5. The apparatus as claimed in claim 1, wherein receiving beams in the first level of beams used for scanning before receiving beams in the second level are used for scanning.

6. The apparatus as claimed in claim 1, wherein the second level of beams is used for a next scan after the best beam in the first level is selected.

7. One or more non-transitory machine-readable media having instructions stored thereon that, if executed by baseband processing circuitry of user equipment (UE), result in:
receiving a Beamforming Reference Signal (BRS) transmission from an evolved NodeB (eNB) via one or more transmission beams;
dividing receiving beams into two or more levels;
in a first frame:
scanning the one or more transmission beams using a first level of receiving beams for the first level;
scanning the one or more transmission beams using a second level of receiving beams for the second level;
wherein consecutive receiving beams in the first level of receiving beams and the second level of receiving beams are used for different transmission beams;
selecting a best receiving beam from the scan of the first level and the scan of the second level;
in a second frame:
scanning the one or more transmission beams in the first level of receiving beams and the second level of receiving beams using only neighbor beams immediately neighboring the best receiving beam;
selecting a best transmission beam based on scans from the first frame and the second frame; and
receiving transmissions from the eNB using the best transmission beam and the best receiving beam.

8. The one or more non-transitory machine-readable media as claimed in claim 7, wherein the first level receiving beams covers a full Azimuth angle of Arrival (AoA) span and a full Zenith angle of Arrival (ZoA) span.

9. The one or more non-transitory machine-readable media as claimed in claim 7, wherein the neighbor beams comprise receiving beams having a minimum difference in Azimuth angle of Arrival (AoA).

10. The one or more non-transitory machine-readable media as claimed in claim 7, wherein the neighbor beams comprise receiving beams having a minimum difference in Zenith angle of Arrival (ZoA).

11. The one or more non-transitory machine-readable media as claimed in claim 7, wherein receiving beams in the first level of beams used for scanning before receiving beams in the second level are used for scanning.

12. The one or more non-transitory machine-readable media as claimed in claim 7, wherein the second level of beams is used for a next scan after the best beam in the first level is selected.

\* \* \* \* \*